United States Patent
Fourquin et al.

(10) Patent No.: US 7,562,459 B2
(45) Date of Patent: Jul. 21, 2009

(54) METHOD FOR ENTERING COMMANDS AND/OR CHARACTERS FOR A PORTABLE COMMUNICATION DEVICE EQUIPPED WITH A TILT SENSOR

(75) Inventors: Xavier Fourquin, Sevres (FR); Nicolas Balley, Paris (FR)

(73) Assignee: TCL Communication Technology Holdings, Ltd., Hong Kong (CN)

(*) Notice: Subject to any disclaimer, the term of this patent is extended or adjusted under 35 U.S.C. 154(b) by 0 days.

(21) Appl. No.: 11/649,885

(22) Filed: Jan. 5, 2007

(65) Prior Publication Data

US 2007/0180718 A1 Aug. 9, 2007

(30) Foreign Application Priority Data

Jan. 6, 2006 (EP) .................................. 06100130

(51) Int. Cl.
*G01C 9/06* (2006.01)

(52) U.S. Cl. .................... 33/366.11; 702/85; 702/150

(58) Field of Classification Search . 33/366.11–366.27; 340/689; 702/85, 87, 94, 150, 151, 154
See application file for complete search history.

(56) References Cited

U.S. PATENT DOCUMENTS

| | | | |
|---|---|---|---|
| 5,847,647 A * | 12/1998 | Devine | ........................ 340/689 |
| 6,347,290 B1 | 2/2002 | Bartlett | |
| 6,369,794 B1 | 4/2002 | Sakurai et al. | |
| 6,567,101 B1 | 5/2003 | Thomas | |
| 6,573,883 B1 | 6/2003 | Bartlett | |
| 6,722,049 B2 * | 4/2004 | Singer et al. | .............. 33/366.13 |
| 6,826,844 B2 * | 12/2004 | Endo et al. | ................ 33/366.24 |
| 2004/0083616 A1 * | 5/2004 | Hamar | ..................... 33/366.11 |
| 2004/0227742 A1 | 11/2004 | Fateh et al. | |
| 2005/0166410 A1 * | 8/2005 | Richter et al. | ............ 33/366.12 |
| 2005/0197145 A1 | 9/2005 | Chae et al. | |
| 2006/0146009 A1 * | 7/2006 | Syrbe et al. | .................. 345/156 |
| 2006/0161379 A1 * | 7/2006 | Ellenby et al. | ............... 702/150 |
| 2007/0180719 A1 * | 8/2007 | Donnelly et al. | ......... 33/366.11 |

FOREIGN PATENT DOCUMENTS

| | | |
|---|---|---|
| EP | 1591873 | 11/2005 |
| GB | 2 347 593 | 9/2000 |
| JP | 2002-171316 | 6/2002 |
| JP | 2002-207703 | 7/2002 |
| WO | WO 01/56256 A2 | 8/2001 |
| WO | 03/077087 | 9/2003 |
| WO | 2004/082248 | 9/2004 |
| WO | WO 2006/000639 A1 | 1/2006 |

* cited by examiner

*Primary Examiner*—G. Bradley Bennett
(74) *Attorney, Agent, or Firm*—Morgan, Lewis & Bockius LLP

(57) ABSTRACT

The disclosure relates to a method for entering commands and/or characters for a portable communication device equipped with an input device comprising a tilt sensor, including the steps of determining a motion of the portable communication device through measurements of the tilt sensor calculated in reference to a neutral position of said tilt sensor; and deducing from said motion an associated command and/or character. According to the disclosure, the method further includes a preliminary calibration step triggered by a user of the portable communication device, consisting in defining the neutral position as being the current position of the sensor at the time of triggering the calibration step.

4 Claims, 1 Drawing Sheet

Figure 1:
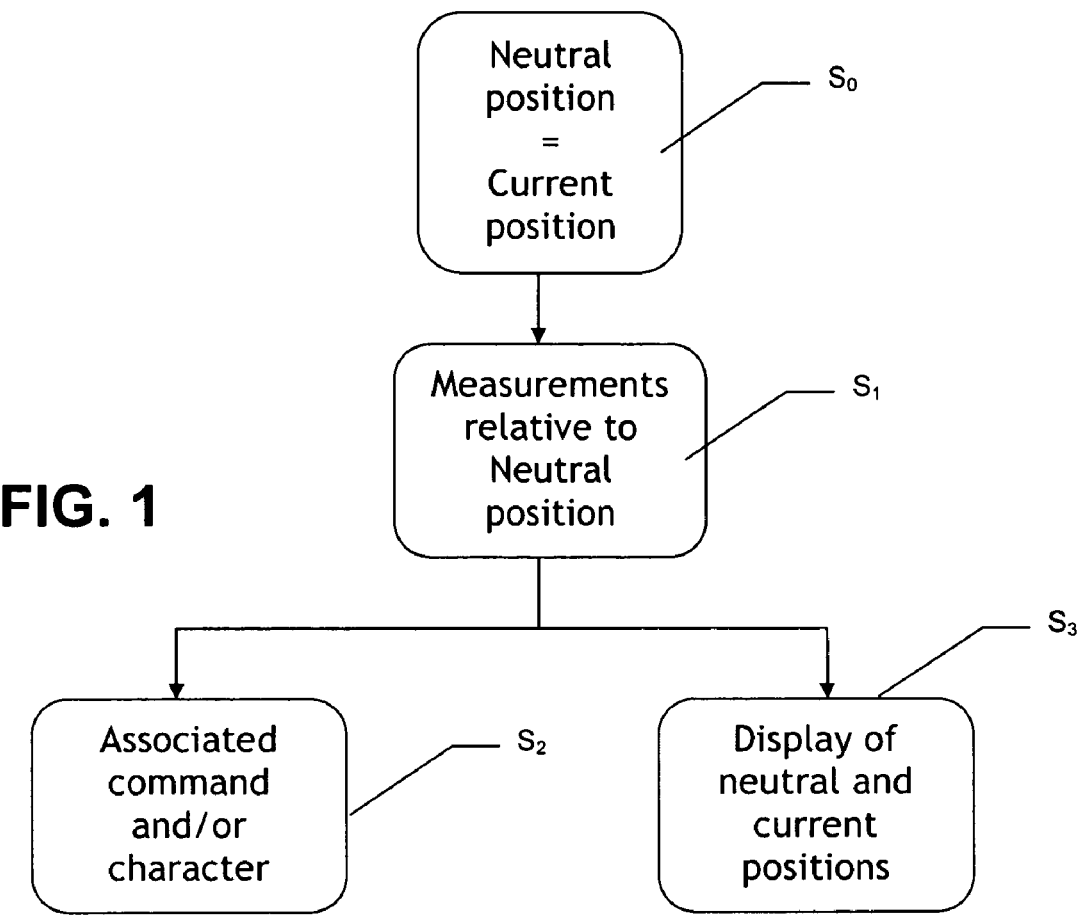

METHOD FOR ENTERING COMMANDS AND/OR CHARACTERS FOR A PORTABLE COMMUNICATION DEVICE EQUIPPED WITH A TILT SENSOR

The present invention claims the benefit of European Patent Application No. 06100130.1 filed in Europe on Jan. 6, 2006, which is hereby incorporated by reference.

The present invention relates to portable communication devices which are provided with an input device using detection of vibration/inclination of the communication device for entering information into the portable device. Portable communication devices which are concerned are all type of handheld communication devices such as PDA or mobile phones.

A great number of entering devices are known for these type of portable device, such as keypads, touch screens used either with the finger, or with a specific stylus, 2D or 4D navigating means in form of a either a single or several navigating keys, or even acoustic means for voice recognition. More recently, new entering devices based on the detection of movement of the portable device through detection of inclination of the portable device with respect to at least one axis, have been developed. These new entering devices include a tilt sensor among at least one of gyroscope, accelerometer, multi-axis gyroscope and multi-axis accelerometer.

Document US2005/0197145 discloses a mobile phone which allows a user to input a phone number in view of taking a call without any manipulation of the keypad, thanks to the use of vibration/inclination detection means. Each number, from 0-9, composing the phone number is deduced from the numbers of detected movements and inclinations according to a predetermined rule.

Document EP 1 591 873 discloses a method and apparatus for entering information into a portable electronic device with the help of a tilt sensor. According to this document, a tilt sensor is used to determine whether a change of inertia around at least one axis corresponds to a tapping of the input device, to identify a contacted region of the input device, and to perform at least one function based on the identity of the contacted region of the input device. The related functions are chosen among controlling a volume, scrolling through a menu or a list of items, selecting an item, and displaying characters or symbols. For entering a number or a character, the user needs to tap consecutively in several regions of the input device. The sequence of identified contacted zones will determine the corresponding character.

At last, a new mobile phone including a 3D accelerometer has come on the market. The accelerometer calculates and ascertains movement of the mobile phone in three dimensional space, and carries out commands according to those calculations. For example, a user will move the phone in the air in a gesture which draws number "3". This motion is calculated by the accelerometer and figure "3" is displayed on the screen of the mobile.

Although this new way of entering command, by motions of the mobile phone according to predetermined gestures, is very trendy, one possible drawback for the user will be to learn the correct gesture he will have to make for a given function, and also how he should handle his mobile phone when he starts any motion of the mobile phone. One reason is that the neutral position of the accelerometer, i.e. the reference position from which the calculations are made, is calibrated and fixed at the time of manufacturing the mobile phone, depending on the location and orientation of the accelerometer inside the housing. This means that, each time the user will have to use the accelerometer's functionalities, for instance for navigation purposes, he will have first to correctly position his mobile phone in order to be in correspondence with the neutral position of the accelerometer. For instance, if the neutral position of the accelerometer is defined for vertical position of the mobile phone, the user will have to start any gesture with handling first the mobile phone vertically.

The aim of the invention is to remedy the above drawback by proposing a solution enabling a user to define at any time the neutral position of the accelerometer. To this aim, an object of the present invention is to provide a method for entering commands and/or characters for a portable communication device equipped with an input device comprising a tilt sensor, said method comprising the steps of: determining a motion of said portable communication device through measurements of said tilt sensor calculated in reference to a neutral position of said tilt sensor; and deducing from said motion an associated command and/or character, said method being characterized in that it further comprises a preliminary calibration step triggered by a user of said portable communication device, consisting in defining said neutral position as being the current position of the sensor at the time of triggering said calibration step.

Figure 2:
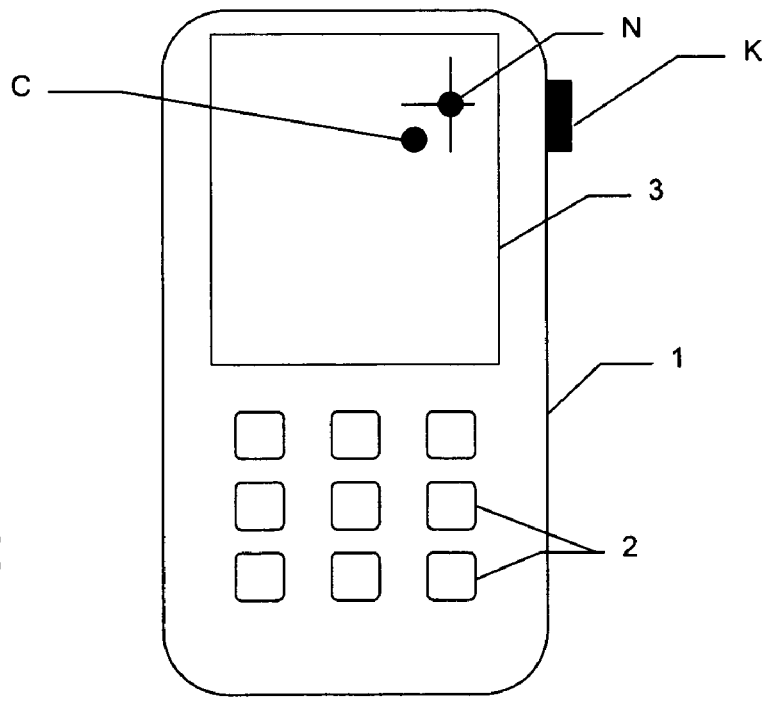

Features and advantages of the invention will become apparent from the following description of the invention with reference the drawings in which:

FIG. 1 is a flowchart showing the successive steps of the method according to the invention; and FIG. 2 shows schematically a portable communication device according to a possible embodiment of the invention.

In relation with FIG. 2, a portable communication device 1 for which method according to the invention may be implemented may comprise a classical entering device, such as a keypad included several keys 2, and a screen 3 for displaying different items such as menus through which a user can navigate, or data relating to the status of the device (battery level, cellular network coverage in case of a mobile phone, date . . . ), or characters and/or numbers which are entered by the user, for instance for taking a call or sending a message. Portable communication device 1 also includes an input device (not shown) comprising a tilt sensor which can calculate the motion of the portable device in at least a two dimensional space. As it is already known, such an input device may be used for entering commands and/or characters according to a method comprising the following successive steps, shown on FIG. 1. During a first step $S_1$, several measurements are made by the tilt sensor in reference to a neutral position of said tilt sensor and are used to determine a motion of the portable communication device. In a subsequent step $S_2$, the command and/or character in correspondence with the motion is deduced. It is not an object of the invention to detail herewith the exact software processing which is made at this stage.

As already mentioned above, in known methods, the neutral position which is used as reference for measurements performed by the tilt sensor corresponds to a fixed position calibrated at the time of manufacturing the portable device, and depends on the intrinsic properties of the sensor, and on the way the sensor is positioned inside the device.

According to the invention, the user has now the opportunity to calibrate at any time the neutral position used as reference for the measurements. To this aim, method according to the invention includes a preliminary calibration step $S_0$ wherein the neutral position is defined as being the current position of the sensor (i.e. of the portable communication device) at the time of entering into said calibration step. This calibration step is triggered by said user, i.e. is performed on the request of said user. This can be made for instance by actuation of a key of device 1 (for instance key K shown on FIG. 2). Alternatively, a particular gesture f the user, leading to a particular motion of the portable device can also be recognized by tilt sensor and processing means as corresponding to a wish to enter into said calibration step. Triggering of said step may also be made by any other entering means, such as voice recognition.

Let's assume that the portable communication device is configured such that when a user draws a "3" in the space with the device, number "3" appears on the screen, and that the original neutral position of the sensor corresponds to the portable device held in vertical position. With the known method, a user will have first to position the device in the vertical position before drawing a "3" in the space. Thanks to the invention, the user can choose the current position of the sensor as a new neutral position, and perform a gesture which will be recognized even if this new neutral position does not corresponds to the originating one. Typically, the user can draws a "3" in the space while he is lying on his bed without having to hold his portable device vertically.

In a preferred embodiment of the method according to the invention, a further step $S_3$ is provided for displaying on screen 3 of portable device 1 a little target, with a mark or spot N, or any first visual indication the current neutral position, and a mark or spot C, or any second visual indication of any further current position of the device. This will help the user to come back to this neutral position at any time. The center of the target can be defined as the neutral position, while spot C can be easily determined by simply recovering the coordinates delivered by the sensor.

In the example shown on FIG. 2, a 2D accelerometer has been considered. Consequently, visual indications for both current neutral position and current position of the device are made with respect to a two axis coordinates system. In case of a 3D accelerometer, any suitable three dimensional representation could be used in order to help the user to come back to a neutral position.

The invention claimed is:

1. A method for entering commands and/or characters for a portable communication device equipped with an input device comprising a tilt sensor, said method comprising the steps of:
   determining a motion of said portable communication device through measurements of said tilt sensor calculated in reference to a neutral position of said tilt sensor;
   deducing from said motion an associated command and/or character,
   said method being characterized in that it further comprises a preliminary calibration step triggered by a user of said portable communication device, consisting in defining said neutral position as being the current position of the sensor at the time of triggering said calibration step.

2. The method according to claim 1, wherein said preliminary calibration step is triggered by the user upon actuation of a key.

3. The method according to claim 1, wherein said preliminary calibration step is triggered by the user upon predetermined gesture of the user detected by said tilt sensor.

4. The method according to any of claims 1, 2, and 3, further comprising a step of displaying on a screen of said portable communication device, a first visual indication of said neutral position, and a second visual indication of any further current position of the device.

* * * * *